US011893990B2

(12) United States Patent
Ramsl

(10) Patent No.: US 11,893,990 B2
(45) Date of Patent: Feb. 6, 2024

(54) AUDIO FILE ANNOTATION

(71) Applicant: SAP SE, Walldorf (DE)

(72) Inventor: Hans-Martin Ramsl, Mannheim (DE)

(73) Assignee: SAP SE, Walldorf (DE)

( * ) Notice: Subject to any disclaimer, the term of this patent is extended or adjusted under 35 U.S.C. 154(b) by 277 days.

(21) Appl. No.: 17/486,661

(22) Filed: Sep. 27, 2021

(65) Prior Publication Data
US 2023/0094828 A1 Mar. 30, 2023

(51) Int. Cl.
G10L 15/22 (2006.01)
G06F 40/295 (2020.01)
G10L 15/26 (2006.01)

(52) U.S. Cl.
CPC ............ *G10L 15/22* (2013.01); *G06F 40/295* (2020.01); *G10L 15/26* (2013.01); *G10L 2015/223* (2013.01)

(58) Field of Classification Search
CPC ... G10L 15/22; G10L 15/26; G10L 2015/223; G10L 25/30; G10L 25/54; G06F 40/295; G06F 16/685; G06F 40/131; G06F 40/166; G06F 40/169; G06F 40/216; G06F 40/30
USPC .......................................................... 704/235
See application file for complete search history.

(56) References Cited

U.S. PATENT DOCUMENTS

| | | | |
|---|---|---|---|
| 9,047,283 B1 * | 6/2015 | Zhang ................. | G06F 16/3346 |
| 9,467,718 B1 * | 10/2016 | Newell ................... | G10L 15/26 |
| 10,607,611 B1 * | 3/2020 | Shellef ..................... | G10L 15/01 |
| 10,945,040 B1 * | 3/2021 | Bedi ........................ | G10L 15/26 |
| 10,965,812 B1 * | 3/2021 | Das ........................ | G06F 40/216 |
| 10,997,223 B1 * | 5/2021 | Christodoulopoulos .................... G06F 40/295 |
| 11,042,700 B1 * | 6/2021 | Walters .................. | G06N 20/00 |
| 11,302,360 B1 * | 4/2022 | Gupta ................... | G06F 3/0482 |
| 11,341,337 B1 * | 5/2022 | Novak .................... | G06F 40/30 |
| 11,609,738 B1 * | 3/2023 | Imbruce ................ | G06F 16/638 |
| 11,637,923 B1 * | 4/2023 | Manzanillo ......... | G06F 16/3329 455/404.2 |
| 11,669,567 B2 * | 6/2023 | Klein ...................... | G10L 17/18 707/706 |
| 11,687,576 B1 * | 6/2023 | Katz .................. | H04N 21/4882 715/254 |
| 11,714,595 B1 * | 8/2023 | Libin ...................... | G10L 15/22 704/235 |

(Continued)

FOREIGN PATENT DOCUMENTS

WO  WO-2017124116 A1 *  7/2017

*Primary Examiner* — Thuykhanh Le
(74) *Attorney, Agent, or Firm* — SCHWEGMAN LUNDBERG & WOESSNER, P.A.

(57) ABSTRACT

Text-to-speech translation is used to generate a transcript for an audio file. Text segments are associated with time segments in the transcript. A trained machine learning model determines, based on the text in the transcript, one or more topics for the audio file. The transcript is modified to include the determined one or more topics. A user interface may be presented that allows a user to search for portions of an audio file that relate to a particular topic. In response to the selected or entered topic, the user interface presents segments having a matching topic. The user may use voice or other user interface commands to modify the annotation of the audio file. User commands may also be used to extract data from the transcript and copy the data to a clipboard or to another application.

20 Claims, 11 Drawing Sheets

(56) References Cited

U.S. PATENT DOCUMENTS

| | | | |
|---|---|---|---|
| 11,734,517 B1* | 8/2023 | Abi-Akl | G06F 40/279 715/231 |
| 11,805,189 B1* | 10/2023 | Manzanillo | G10L 15/26 |
| 2004/0025191 A1* | 2/2004 | McDermott-Walsh | H04N 21/2543 348/E7.071 |
| 2007/0118865 A1* | 5/2007 | Saito | H04N 21/44008 725/86 |
| 2008/0066136 A1* | 3/2008 | Dorai | G06F 16/7834 725/135 |
| 2008/0103773 A1* | 5/2008 | Kirshenbaum | G06F 40/30 704/252 |
| 2017/0270098 A1* | 9/2017 | Liu | G06F 40/186 |
| 2018/0005037 A1* | 1/2018 | Smith, IV | G06V 20/64 |
| 2018/0214075 A1* | 8/2018 | Falevsky | G16H 50/30 |
| 2018/0239822 A1* | 8/2018 | Reshef | G06F 40/35 |
| 2018/0268053 A1* | 9/2018 | Tata | G06F 16/345 |
| 2018/0294014 A1* | 10/2018 | Ekambaram | G11B 27/24 |
| 2019/0043506 A1* | 2/2019 | Rivkin | G06N 3/08 |
| 2019/0066686 A1* | 2/2019 | Baracaldo Angel | G10L 21/0208 |
| 2019/0155947 A1* | 5/2019 | Chu | G06F 16/358 |
| 2019/0188479 A1* | 6/2019 | Balasubramanian | G06T 7/251 |
| 2019/0215578 A1* | 7/2019 | Beckett | H04N 21/8126 |
| 2019/0287415 A1* | 9/2019 | Zavesky | G09B 7/00 |
| 2019/0294630 A1* | 9/2019 | Alakoye | G10L 15/26 |
| 2019/0318742 A1* | 10/2019 | Srivastava | G10L 15/32 |
| 2020/0013380 A1* | 1/2020 | Kakoyiannis | G10H 1/0008 |
| 2020/0050701 A1* | 2/2020 | Ramasamy | G06F 3/067 |
| 2020/0050702 A1* | 2/2020 | McCormack | G06F 16/686 |
| 2020/0120433 A1* | 4/2020 | Serman | H04R 25/453 |
| 2020/0175973 A1* | 6/2020 | Bender | G06N 5/01 |
| 2020/0250269 A1* | 8/2020 | Koseki | G06N 3/045 |
| 2020/0294487 A1* | 9/2020 | Donohoe | G10L 15/22 |
| 2020/0312331 A1* | 10/2020 | Gustafson | G06F 3/017 |
| 2020/0342895 A1* | 10/2020 | Jung | G10L 15/26 |
| 2021/0027783 A1* | 1/2021 | Szymanski | G06N 3/08 |
| 2021/0110154 A1* | 4/2021 | Beller | G10L 15/26 |
| 2021/0201934 A1* | 7/2021 | Lyu | G06N 20/00 |
| 2021/0256221 A1* | 8/2021 | Beaugh | G06N 3/088 |
| 2021/0259616 A1* | 8/2021 | Kocher | A61B 5/378 |
| 2021/0295822 A1* | 9/2021 | Tomkins | G06F 16/2237 |
| 2021/0383799 A1* | 12/2021 | Hewitt | G10L 15/26 |
| 2022/0050872 A1* | 2/2022 | Adlersberg | G06F 3/165 |
| 2022/0101852 A1* | 3/2022 | Nakadai | G06F 40/30 |
| 2022/0108697 A1* | 4/2022 | Saeki | G06F 16/353 |
| 2022/0115001 A1* | 4/2022 | Bratt | G10L 15/22 |
| 2022/0147770 A1* | 5/2022 | Jain | G06F 40/117 |
| 2022/0157301 A1* | 5/2022 | O'Connor | G06F 40/30 |
| 2022/0208155 A1* | 6/2022 | Ivers | G10H 1/368 |
| 2022/0264180 A1* | 8/2022 | Brannon | H04N 21/845 |
| 2022/0391591 A1* | 12/2022 | Ronen | G06F 40/117 |
| 2023/0005497 A1* | 1/2023 | Zhu | G10L 15/04 |
| 2023/0032159 A1* | 2/2023 | Kalinichenko | H04L 12/1831 |
| 2023/0036192 A1* | 2/2023 | Alakoye | G10L 15/26 |
| 2023/0046248 A1* | 2/2023 | Veyseh | G06N 3/04 |
| 2023/0061646 A1* | 3/2023 | D'Amico | H04N 1/00244 |
| 2023/0062177 A1* | 3/2023 | Landry | G06F 16/313 |
| 2023/0090601 A1* | 3/2023 | Benke | G06F 40/30 704/9 |
| 2023/0090993 A1* | 3/2023 | Yang | G06F 40/30 704/9 |
| 2023/0178099 A1* | 6/2023 | Haimi-Cohen | G10L 15/30 704/206 |
| 2023/0239625 A1* | 7/2023 | Pinkerton | H03F 3/183 381/59 |
| 2023/0262425 A1* | 8/2023 | Frolovichev | H04W 20/91 455/518 |
| 2023/0290169 A1* | 9/2023 | Chen | G06V 30/18 382/176 |
| 2023/0306960 A1* | 9/2023 | Malone | G10L 15/02 704/231 |
| 2023/0360394 A1* | 11/2023 | Gurule | G06T 11/00 |

* cited by examiner

AUDIO FILE ANNOTATION

TECHNICAL FIELD

The subject matter disclosed herein generally relates to annotation of audio files. Specifically, the present disclosure addresses systems and methods to add metadata to transcripts of audio files in response to voice commands.

BACKGROUND

Audio files are generated when a presentation or meeting is recorded. A user listening to an audio file creates notes regarding the contents of the audio file using a separate application, such as a word processor.

DETAILED DESCRIPTION

Figure 1:
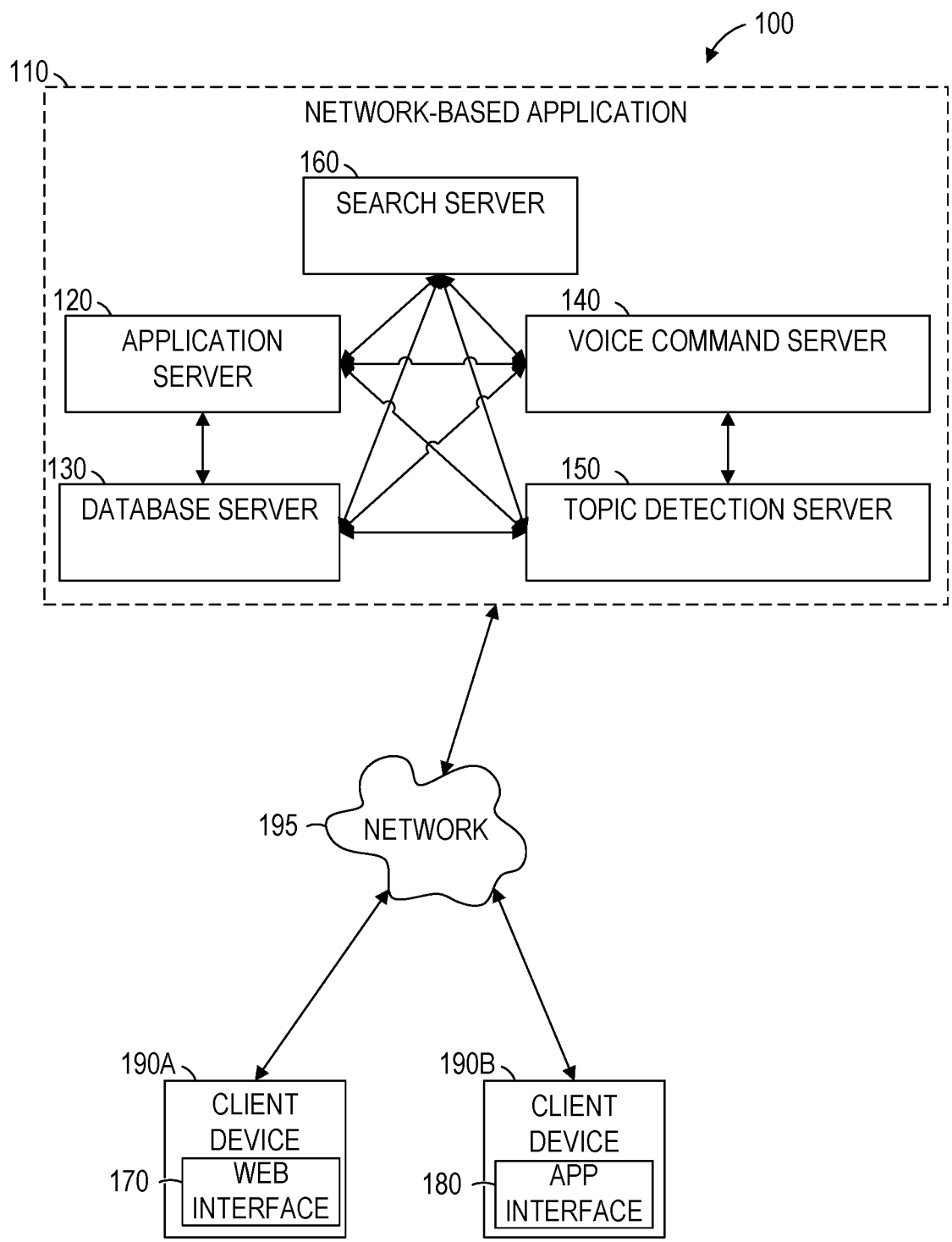
FIG. 1 is a network diagram illustrating an example network environment suitable for audio file annotation.

Example methods and systems are directed to providing an improved system for audio file annotation. Text-to-speech translation is used to generate a transcript for an audio file. Text segments are associated with time segments in the transcript. For example, the text resulting from speech for each 10-second segment may be associated with the corresponding 10-second segment. Alternatively, the speech may be segmented based on pauses or changes in speaker.

A trained machine learning model determines, based on the text in the transcript, one or more topics for the audio file. The transcript is modified to include the determined one or more topics. For example, a topic may be determined for each one-minute segment of the audio file, each three-minute segment of the audio file, each seven-minute segment of the audio file, or any suitable combination thereof.

The determining of the topic for a segment of the audio file may include determining a confidence level in the topic. For example, the determined topic for a particular one-minute segment may be "justice" with a confidence of 0.6, and the determined topic for another one-minute segment may be "peace" with a confidence of 0.9.

Topics for larger segments may be determined based on the topics and probabilities for component segments. For example, the topic for a three-minute segment comprising three one-minute segments may be selected from the topics for the one-minute segments. The selected topic may be the most popular topic among the component segments, with ties broken by the confidence levels.

A user interface may be presented that allows a user to search for portions of an audio file that relate to a particular topic. For example, all topics present in the audio file may be presented in a drop-down list that allows the user to select a topic. As another example, a text field may be presented into which the user may enter a text string. In response to the selected or entered topic, the user interface presents segments having a matching topic.

The user may use voice or other user interface commands to modify the annotation of the audio file. For example, the user may provide a voice command to "highlight the last ten seconds" or "highlight the last sentence." In response, data is added to corresponding segments in the transcript that indicates that the segments are highlighted.

User commands may also be used to extract data from the transcript and copy the data to a clipboard or to another application. For example, the user may provide a voice command to "copy the last three sentences" or "save the last-mentioned name." In response, the corresponding data is retrieved from the transcript and stored in memory for later use (e.g., a paste command that adds the copied text to a document file).

By comparison with existing methods of annotating audio files, such as taking notes in a separate text file, the methods and systems discussed herein improve functionality by allowing for integration of annotation data into the same file storing a transcript of the audio file, allowing for voice commands for manipulating audio file annotation data while playing back the audio file, allowing for search of an audio file by topic, or any suitable combination thereof.

When these effects are considered in aggregate, one or more of the methodologies described herein may obviate a need for certain efforts or resources that otherwise would be involved in annotating audio files. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating an example network environment 100 suitable for audio file annotation. The network environment 100 includes a network-based application 110, client devices 190A and 190B, and a network 195. The network-based application 110 is provided by application server 120 in communication with a database server 130, a voice command server 140, a topic detection server 150, and a search server 160. The application server 120 accesses application data (e.g., application data stored by the database server 130) to provide one or more applications to the client devices 190A and 190B via a web interface 170 or an application interface 180.

The application server 120, the database server 130, the voice command server 140, the topic detection server 150, the search server 160, and the client devices 190A and 190B may each be implemented in a computer system, in whole or in part, as described below with respect to FIG. 11. The client devices 190A and 190B may be referred to collectively as client devices 190 or generically as a client device 190.

The application server 120 provides an audio recording application (e.g., an audio or multimedia meeting application, a dictation application, a multimedia recording application, or any suitable combination), an audio playback application (e.g., an audio or multimedia playback application), or both. The application server 120 may provide the web interface 170 or the application interface 180 to allow a user to start and stop recording, initiate processing of a recorded audio file, annotate a recorded audio file, or any suitable combination thereof. The application server 120 may perform speech-to-text conversion on audio files to generate transcripts for the audio files. The transcripts may include timestamps that link portions of each transcript with portions of the corresponding audio file.

The voice command server 140 receives voice commands from the client devices 190 and causes responsive operations to be performed. For example, the application server 120 may receive a voice command from a client device 190 and provide an audio file containing the voice command to the voice command server 140. In response, the voice command server 140 may return a text version of the received voice command, allowing the application server 120 to perform a responsive operation. As another example, a client device 190 may provide audio data to the voice command server 140 without intermediation by the application server 120. The voice command server 140 interprets the voice command and generates a remote procedure call (RPC) or a representational state transfer (REST) call to the application server 120 to cause the responsive function (e.g., annotating an audio file) to be performed.

The topic detection server 150 determines topics based on text. A transcript of an audio file may be provided to the topic detection server 150 by the application server 120. The topic detection server 150 analyzes the text to determine one or more topics addressed in the audio file. Topic detection may be performed using embedding vectors generated by a trained machine learning model. As used herein, "embedding" refers to the conversion of human-readable words (in a natural language or a programming language) into multi-dimensional vectors suitable for computer processing. The vectors may be of one hundred dimensions or more, and thus are not suitable for manual calculation. Training of the language embeddings may be supervised or unsupervised. Supervised training takes labeled data as input. Unsupervised training learns from unlabeled data.

A predetermined set of topics and their corresponding embedding vectors may be used. For any portion of the text, an average embedding vector is determined. The average embedding vector is compared to the embedding vectors for the topics (e.g., using cosine similarity) and the topic with the most-similar embedding vector is selected as the topic for the portion of the text. A single topic may be selected for the transcript of an audio file or multiple topics may be selected. For example, a topic may be selected for each minute of the audio file, each three minute chunk of the audio file, each seven minute chunk of the audio file, or any suitable combination thereof.

The search server 160 provides search functionality to the client devices 190 to search for portions of audio files, annotations for audio files, or both. Search criteria provided via the web interface 170 or the app interface 180 are used to identify corresponding text in one or more annotation files (e.g., text generated by speech-to-text conversion of the audio file, text generated for determined topics, text inserted as user-generated comments, or any suitable combination thereof). In response to the received search criteria, a user interface is presented on the client device 190 that identifies one or more responsive portions of audio files, annotations for audio files, or both.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, the voice command server 140, the topic detection server 150, the search server 160, and the client devices 190A-190B are connected by the network 195. The network 195 may be any network that enables communication between or among machines, databases, and devices. Accordingly, the network 195 may be a wired network, a wireless network (e.g., a mobile or cellular network), or any suitable combination thereof. The network 195 may include one or more portions that constitute a private network, a public network (e.g., the Internet), or any suitable combination thereof.

Figure 2:
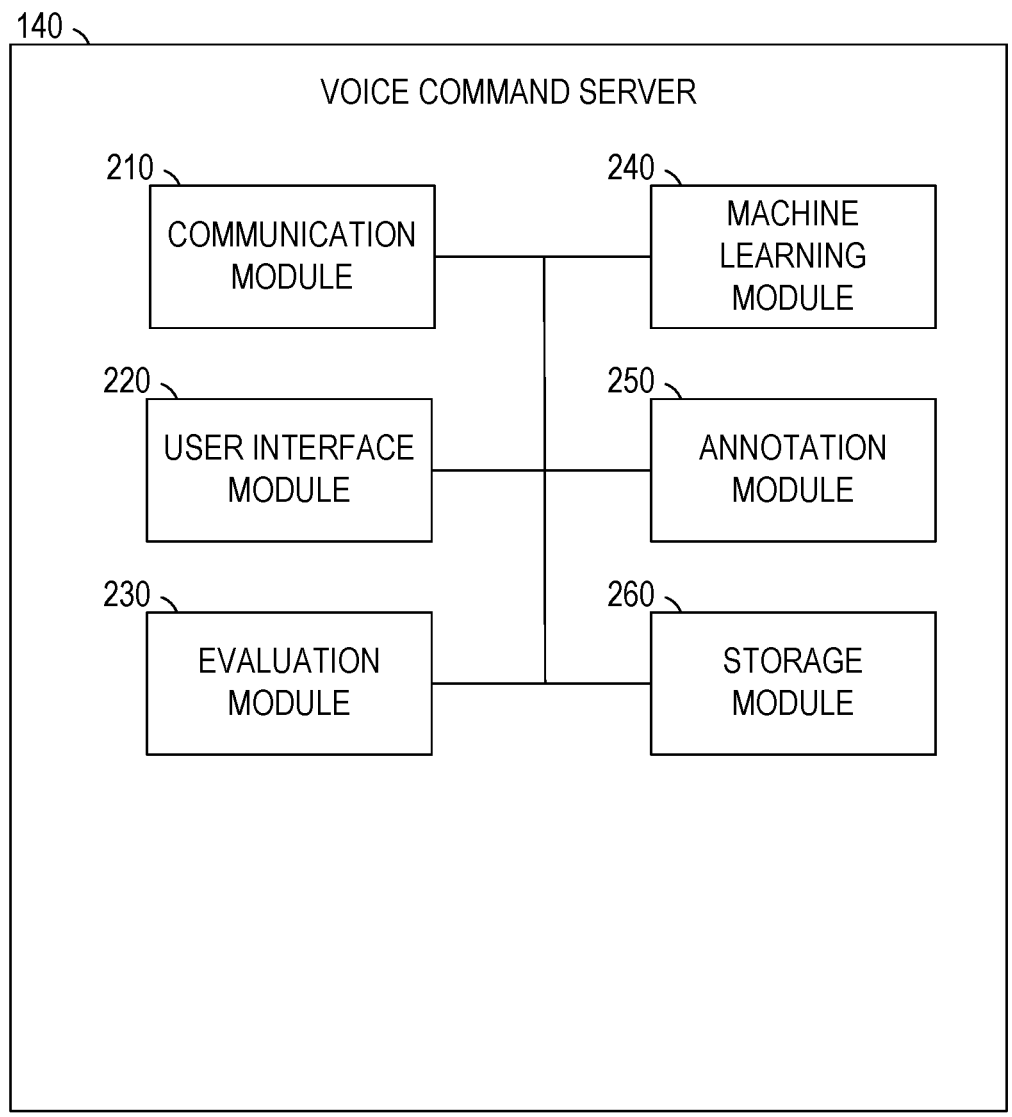
FIG. 2 is a block diagram of an example voice command server, suitable for receiving voice commands and annotating audio files.

FIG. 2 is a block diagram of an example voice command server 140, suitable for receiving voice commands and annotating audio files. The voice command server 140 is shown as including a communication module 210, a user interface module 220, an evaluation module 230, a machine learning module 240, an annotation module 250, and a storage module 260, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the voice command server 140 and transmits data from the voice command server 140. For example, the communication module 210 may receive, from the client device 190A or 190B, search criteria for searching for portions of an audio file. The search criteria may comprise keywords, a selection of one or more audio files, a selection of a time range within an audio file, or any suitable combination thereof. The audio files and annotations to be searched by the voice command server 140 may be stored on the application server 120 (e.g., on a hard drive) or in remote storage (e.g., a network storage device such as the database server 130). Communications sent and received by the communication module 210 may be intermediated by the network 195.

A user interface for searching, recording, annotating, or any suitable combination thereof is provided by the voice command server 140 using the user interface module 220. For example, a hypertext markup language (HTML) document may be generated by the user interface module 220, transmitted to a client device 190 by the communication module 210, and rendered on a display device of the client device 190 by a web browser executing on the client device 190. The user interface may comprise text fields, drop-down menus, and other input fields, in addition to or in place of a voice interface. The user interface may also comprise search results.

The machine learning module 240 trains machine learning models to perform various functions based on training data. For example, a machine learning model may be trained to generate embedding vectors, to determine topics for text, to translate speech to text, or any suitable combination thereof.

The evaluation module 230 evaluates text files to determine topics, evaluates received audio to determine the command to perform, evaluates an input audio file to generate a text transcription file, or any suitable combination thereof. For example, a voice command may be received by the voice command server 140. The evaluation module 230 may convert the voice command to text using a trained machine learning model of the machine learning module 240. As an example, the received voice command may be "highlight the last minute." Based on a current position in the audio file, timestamps in a transcript of the audio file, and the voice command, the evaluation module 230 causes the annotation module 250 to modify the transcript to indicate that the portion of the transcript corresponding to the minute of audio prior to the current playback position is highlighted.

In addition to highlighting selected portions of the transcript, the annotation module 250 may add, delete, or modify other annotations. For example, comments may be inserted into the transcript.

Trained machine learning models, search queries, search results, audio files, annotation files, or any suitable combination thereof may be stored and accessed by the storage module 260. For example, local storage of the voice command server 140, such as a hard drive, may be used. As another example, network storage may be accessed by the storage module 260 via the network 195.

Figure 3:
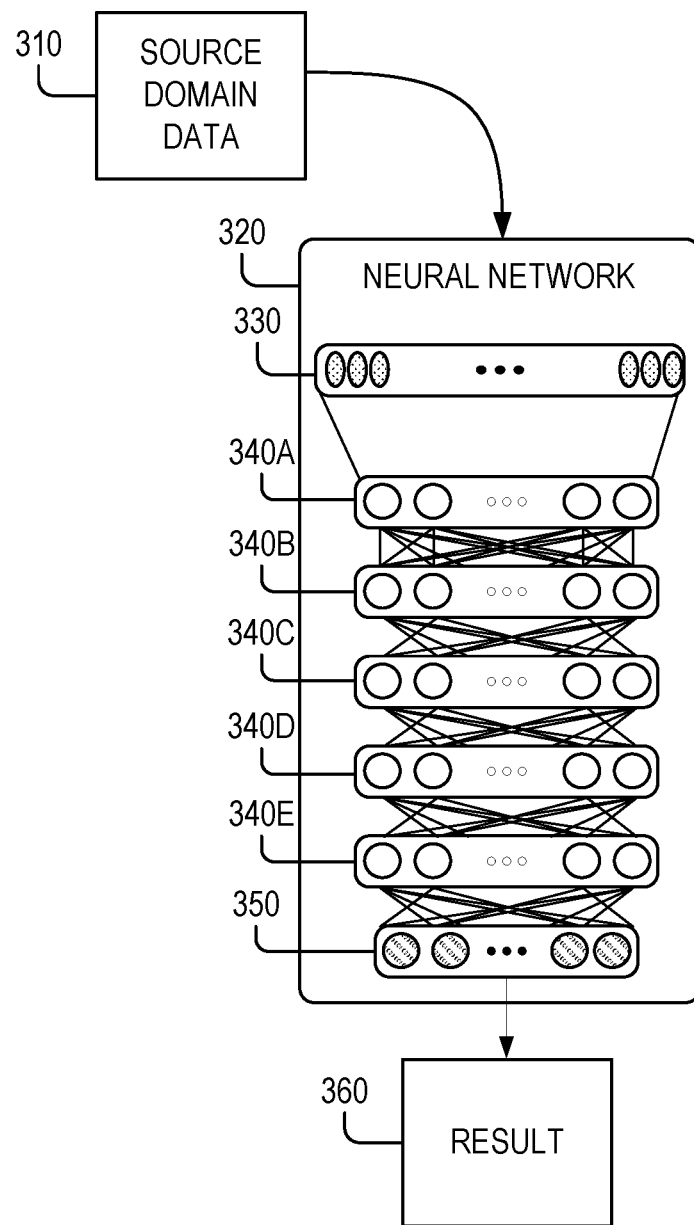
FIG. 3 is a block diagram of an example neural network, suitable for use in determining topics of audio files.

FIG. 3 illustrates the structure of an example neural network 320. The neural network 320 takes source domain data 310 as input; processes the source domain data 310 using the input layer 330; the intermediate, hidden layers 340A, 340B, 340C, 340D, and 340E; and the output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 350 is the result 360. The intermediate layers 340A-340E are referred to as "hidden" because they do not interact directly with either the input or the output, and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. The number of epochs may be 10, 100, 500, 1000, or another number. Within an epoch, one or more batches of the training dataset are used to train the model. Thus, the batch size ranges between 1 and the size of the training dataset while the number of epochs is any positive integer value. The model parameters are updated after each batch (e.g., using gradient descent).

In a supervised learning phase, a model is developed to predict the output for a given set of inputs and is evaluated over several epochs to more reliably provide the output that is specified as corresponding to the given input for the greatest number of inputs for the training dataset. The training dataset comprises input examples with labeled outputs. For example, a user may label images based on their content and the labeled images used to train an image identifying model to generate the same labels.

For self-supervised learning, the training dataset comprises self-labeled input examples. For example, a set of color images could be automatically converted to black-and-white images. Each color image may be used as a "label" for the corresponding black-and-white image and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs— having reached a performance plateau—the learning phase for the given model may terminate before the epoch number/computing budget is reached.

Once the learning phase is complete, the models are finalized. The finalized models may be evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 320 may be a deep learning neural network, a deep convolutional neural network, a recurrent neural network, or another type of neural network. A neuron is an architectural element used in data processing and artificial intelligence, particularly machine learning. A neuron implements a transfer function by which a number of inputs are used to generate an output. The inputs may be weighted and summed, with the result compared to a threshold to determine if the neuron should generate an output signal (e.g., a 1) or not (e.g., a 0 output). Through the training of a neural network, the inputs of the component neurons are modified. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task which the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

The structure of each layer may be predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, deep neural networks, genetic or evolutionary algorithms, and the like.

Figure 4:
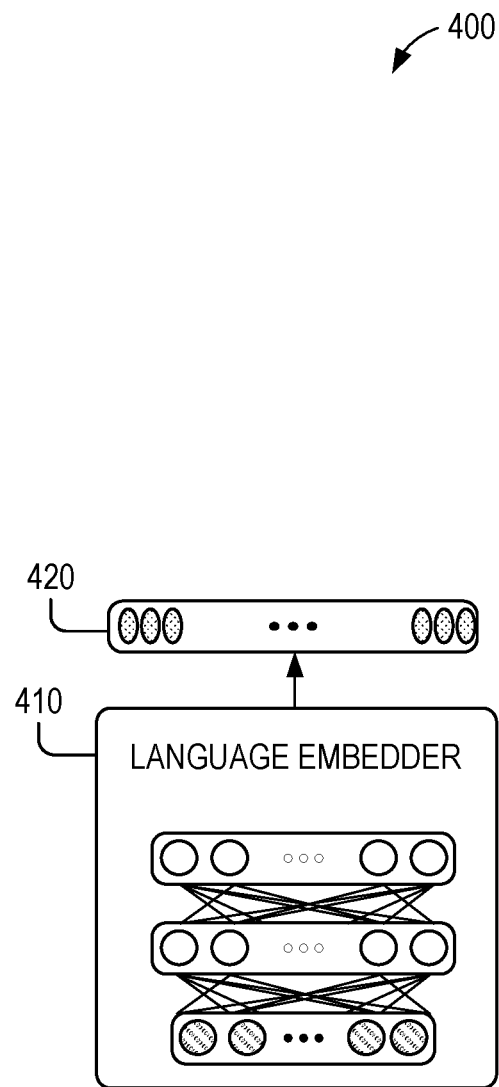
FIG. 4 is a block diagram of an example neural network, suitable for generating language embeddings for text generated by a speech-to-text translator.

FIG. 4 is a block diagram of an example model architecture 400 for language embedding. The model architecture 400 includes a language embedder 410 and a resulting vector 420. The language embedder 410 is trained so that the distance (or loss) function for two related text strings is reduced or minimized. For example, synonymous natural language text or programming language text may be provided as inputs and the language embedder 410 trained to minimize the distance between the resulting vectors.

The specific architecture of the language embedder 410 may be chosen dependent on the type of input data for an embedding layer that is followed by some encoder architecture that creates a vector from the sequence. Embeddings and encoder parameters are shared between the text fields. In the simplest case, the encoder stage is just an elementwise average of the token embeddings.

Alternatively, the encoding may include converting pairs of words of the text to bigram vectors and combining the bigram vectors to generate a vector for the text. For example, the text "function performs" may have a corresponding vector as a bigram, rather than two separate vectors for "function" and "performs" that are combined. The text "This function processes incoming emails to detect junk" may be stripped of articles and prepositions and converted to vectors for each of the bigrams "This function," "function processes," "processes incoming," "incoming emails," "emails detect," and "detect junk." The vector for a text string may be determined as an average of the bigram vectors for the bigrams in the text string.

In some example embodiments, a pre-trained vector embedding is used rather than training an embedding on a training set. For example, the doc2vec embedding may be used.

Figure 5:
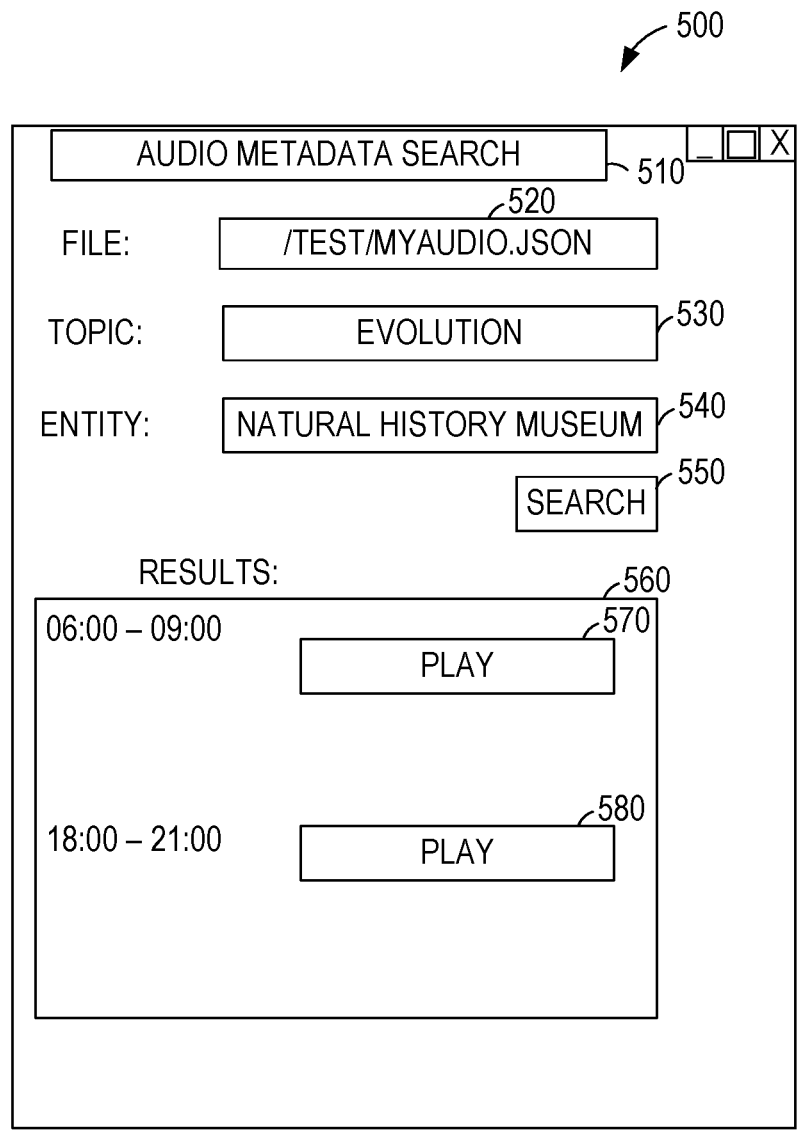
FIG. 5 is a block diagram of an example user interface for searching for portions of an audio file relating to a selected topic and presenting search results.

FIG. 5 is a block diagram of an example user interface 500 for searching for portions of an audio file relating to a selected topic and presenting search results. The user interface 500 includes a title 510; input fields 520, 530, and 540; search results area 560; and buttons 550, 570, and 580. The user interface 500 may be displayed on a display device of the client device 190A or 190B in response to a request from a user of the client device 190A or 190B. For example, a user may press a button on a user interface that causes the user interface 500 to be presented (e.g., by causing the search server 160 to generate an HTML document and provide it to the client device 190A for rendering the user interface 500 on a display device of the client device 190A).

The title 510 indicates that the user interface 500 is for an audio metadata search. The user interacts with the input fields 520, 530, and 540 to provide the criteria for the search. For example, the input field 520 may be implemented as a drop-down selector that allows the user to select an audio metadata file from a list of available audio metadata files. Alternatively, the user may drag an icon representing an audio metadata file from a file system browser to the user interface 500, which recognizes the audio metadata file represented by the icon and populates the input field 520. The user interface 500 may allow multiple files to be identified for search. For example, the input field 520 may be used to identify a folder containing multiple files.

The input field 530 may be implemented as a text field that allows the user to enter one or more topics. Alternatively, the input field 530 may allow the user to select one or more topics from a set of predefined topics (e.g., all topics from the selected file). The input field 540 may be implemented as a text field that allows the user to enter one or more named entities. Alternatively, the input field 540 may allow the user to select one or more topics from a set of predefined named entities (e.g., all named entities from the selected file). After providing the search criteria, the user may press the button 550 to submit the search criteria to the search server 160 via the network 195.

In response to receiving the search criteria, the search server 160 accesses data from the audio metadata file or files indicated by the input field 520 and identifies zero or more search results responsive to the topic indicated by the input field 530, the named entity indicated by the input field 540, or both. The search server 160 selects zero or more of the identified search results and provides them to the client device 190A for display in the user interface 500. In the example of FIG. 5, two search results are provided and displayed in the search results area 560. Information about the search results is displayed. In the example of FIG. 5, the displayed information includes the time range of the responsive audio in the audio file corresponding to the /test/myaudio.json metadata file. More or fewer pieces of information may be displayed. For example, a name of the audio file, a name of the audio metadata file, a creation date of the audio file, a last modified date of the audio metadata file, a creator name of the audio metadata file, a measure of quantity (e.g., lines annotated in the audio metadata file responsive to the query, number of seconds in the audio file responsive to the query, size of the audio metadata file, size of the audio file, or the like), or any suitable combination thereof may be included.

The buttons 570 and 580 are operable to cause the portion of the audio file corresponding to the search result to be played. Thus, by use of the user interface 500, a user is enabled to search for portions of one or more audio files that match the user's search criteria and to play the responsive portions. By accessing responsive portions through a search interface, the user is saved the effort of playing the entire audio file to identify portions of interest.

The annotation file for the audio file may be annotated with topics by using one or more machine learning models as discussed below with respect to FIGS. 7-8. The annotation file for the audio file may be annotated with information about named entities by using a named entity recognition engine (e.g., a trained machine learning model) that recognizes named entities in the annotation file and inserts annotations indicating the named entities. For example, a portion of the annotation file may initially be as shown below.

00:12:11.990→00:12:14.539
Let's go to Taco Bell
00:12:14.539→00:12:14.549
Nah, Bill, I prefer McDonald's
00:12:16.640→00:12:16.650
But McDonald's doesn't have tacos The named entity recognition engine recognizes Bill, Taco Bell®, and McDonald's® as the names of entities and updates the annotation file as shown below. Both the name of the entity and the type of entity (e.g., person, business, organization, government, country, book, movie, play, sports team, and the like). The annotations may be added in JavaScript Object Notation (JSON) format.

Let's go to Taco Bell

{
   "type": "Named Entity",
   "entity type": "business",
   "entity name": "Taco Bell"
}

00:12:14.539→00:12:14.549
Nah, Bill, I prefer McDonald's

{
   "type": "Named Entity",
   "entity type": "business",
   "entity name": "McDonald's"
}
{
   "type": "Named Entity",
   "entity type": "person",
   "entity name": "Bill"
}

00:12:16.640→00:12:16.650
But McDonald's doesn't have tacos

{
   "type": "Named Entity"
   "entity type": "business",
   "entity name": "McDonald's"
}

Thus, after annotation, the segment 00:12:11.990-00:12:14.539 is associated with "Taco Bell" and the other two segments are associated with "McDonald's." Additionally, the segment 00:12:14.539-00:12:14.549 is associated with "Bill." As a result, the search server 160 is enabled to quickly process the named entity search criteria to find segments that correspond to named entities.

In addition to the name of the entities, each named entity annotation includes the entity type. Thus, the user interface 500 may provide separate selectors for each entity type or allow the user to drill down to find a desired entity by selecting a type first (e.g., either business or person) and then an entity (e.g., a person from a list of people or a business from a list of businesses).

Figure 6:
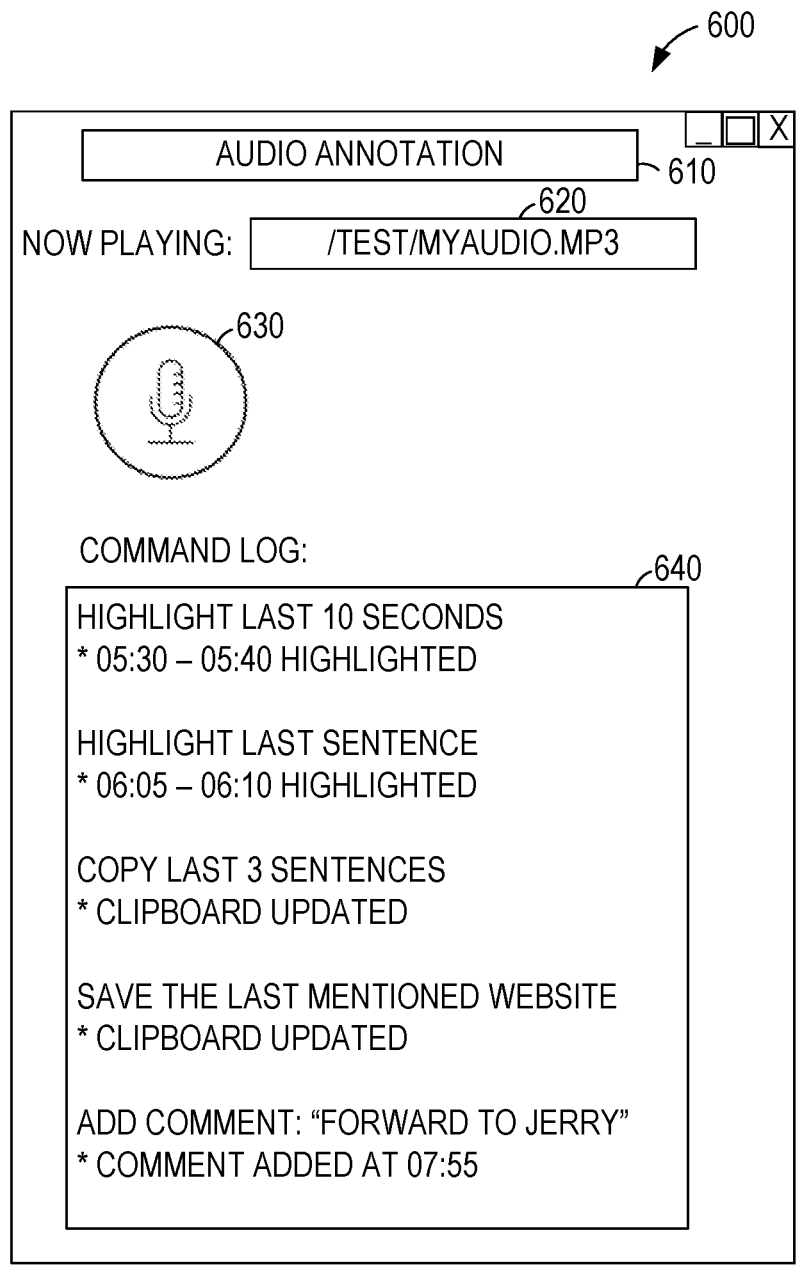
FIG. 6 is a block diagram of an example user interface for receiving and processing voice commands for annotating audio files.

FIG. 6 is a block diagram of an example user interface 600 for receiving and processing voice commands for annotating audio files. The user interface 600 includes a title 610, audio file identification 620, a button 630, and a command log 640. The user interface 600 may be displayed on a display device of the client device 190A or 190B in response to a request from a user of the client device 190A or 190B. For example, a user may press a button on a user interface that causes the user interface 600 to be presented (e.g., by causing the voice command server 140 to generate an HTML document and provide it to the client device 190A for rendering the user interface 600 on a display device of the client device 190A).

The title 610 indicates that the user interface 500 is for audio annotation. The user may interact with the audio file identification 620 to select a file to be played. Alternatively, the user interface 600 may be displayed in response to selection of the button 570 or the button 580 of the user interface 500. In either case, while an audio file is being played, the audio file identification 620 identifies the currently playing audio file.

The user adds annotation to the audio file by providing voice commands, keyboard commands, or both. For example, the user may click the button 630 to enable detection of voice commands. A predetermined period of time (e.g., 10 seconds) after clicking the button 630, detection of voice commands is automatically disabled. The client device 190A or 190B comprises a microphone that receives the voice commands. The voice commands are provided via the network 195 to the voice command server 140. The voice command server 140 processes the voice commands by performing speech recognition to determine the vocalized commands. Alternatively, the client device 190A or 190B determines the vocalized commands.

In response to recognition of a command, the audio metadata file corresponding to the audio file being played is modified. The results of the modification are displayed in the command log 640. Thus, FIG. 6 shows that the audio file /test/myaudio.mp3 is being played and that the user has provided instructions to "highlight last 10 seconds," "highlight last sentence," "copy last 3 sentences," "save the last-mentioned website," and "add comment: 'forward to Jerry.'" In response to these commands, the corresponding audio metadata file (e.g., /test/myaudio.json) has been modified to indicate that the time ranges of 05:30-05:40 and 06:05-06:10 are highlighted, data has been copied to the clipboard, and a comment has been added at time 07:55.

Additional example voice commands include "extract all person names in the last 20 minutes" and "extract all business names in the last 40 minutes." Each of these two commands indicates a time range within the audio file and a type of named entity. In response, the portion of the annotation file corresponding to the indicated time range is searched for named entities of the indicated type and the names of the entities are copied to the clipboard. Thus, with reference to the named entity example data discussed above with respect to FIG. 5, the name "Bill" would be extracted as a name of a person and the names "Taco Bell® and McDonald's®" would be extracted as names of businesses.

Thus, by use of the user interface 600, a user is enabled to use voice commands to modify audio metadata for an audio file and to copy portions of the transcript of the audio file to the clipboard for pasting into another application. Later users of the audio metadata file benefit by being able to access comments and highlights inserted into the metadata.

Figure 7:
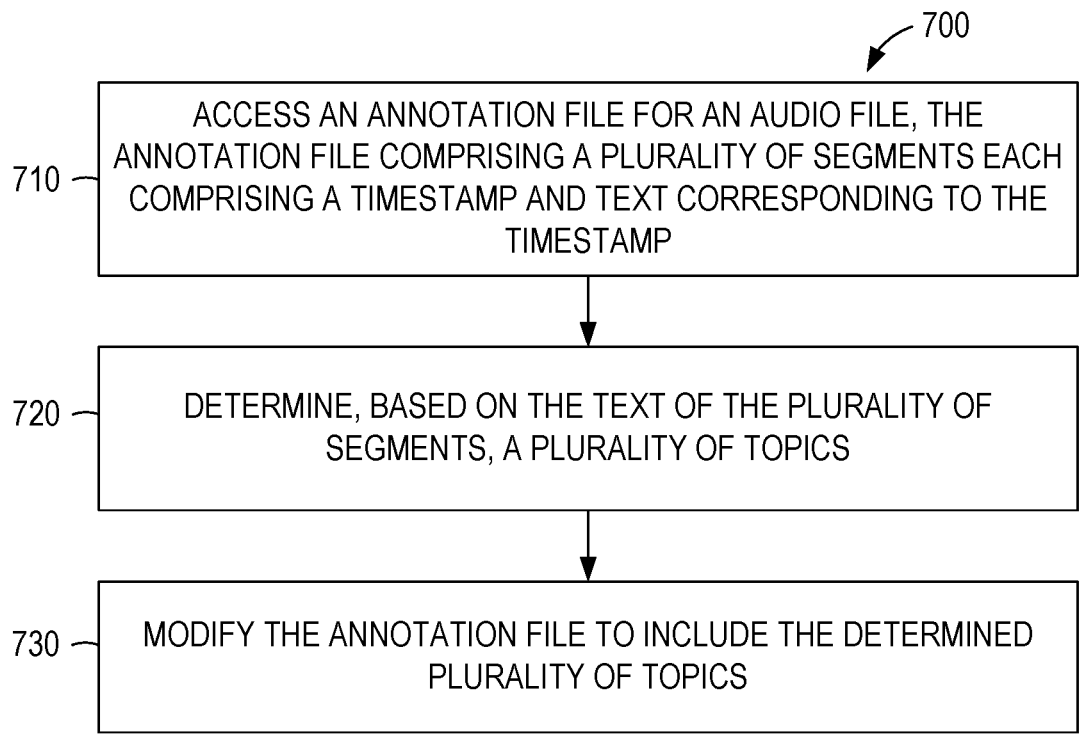
FIG. 7 is a flowchart illustrating operations of an example method suitable for annotating an audio file with topic information.

FIG. 7 is a flowchart illustrating operations of an example method 700 suitable for annotating an audio file with topic information. The method 700 includes operations 710, 720, and 730. By way of example and not limitation, the method 700 may be performed by the topic detection server 150 of FIG. 1, using the modules and structures shown in FIGS. 2-4.

In operation 710, the topic detection server 150 accesses an annotation file for an audio file, the annotation file comprising a plurality of segments each comprising a timestamp and text corresponding to the timestamp. The annotation file may have been generated by a speech-to-text conversion program such as DeepSpeech into a text or WebVTT-format file. An example portion of an annotation file is shown below. In the example annotation file portion below, time ranges are shown in HOUR:MINUTE:SECOND format, followed by the text conversion of the speech in each indicated time range. Each text portion is preceded by an indication of the person speaking.

00:01:11.990→00:01:14.539
<v Roger Binham>our earning release the company is at
00:01:14.539→00:01:15.549
<v Roger Binham>maximum strength our revenues are
00:01:16.640→00:01:17.650
<v Roger Binham>growing faster than everyone else's in The topic detection server 150, in operation 720, determines, based on the text of the plurality of segments, a plurality of topics. For example, a trained machine learning model may be provided the text corresponding to predetermined time periods (e.g., each minute, three minutes, or five minutes) of the annotation file as input and generate a classification of the text as output. Thus, a topic is identified for each of the predetermined time periods (e.g., each minute) of the audio file. Topics may also be identified for larger predetermined time periods (e.g., each three minutes, each five minutes, or each hour) based on the identified topics for smaller time periods. For example, first topics may be identified for each minute based on the text of the annotation file for each minute; second topics may be identified for each three minutes based on the first topics of each three minutes; third topics may be identified for each seven minutes based on the first topics of each seven minutes.

The annotation file is modified by the topic detection server 150, in operation 730, to include the determined plurality of topics. For example, the portion of the annotation file shown above may be modified as shown below.

00:01:11.990→00:01:14.539
<v Roger Binham>our earning release the company is at
00:01:14.539→00:01:15.549
<v Roger Binham>maximum strength our revenues are
00:01:16.640→00:01:17.650
<v Roger Binham>growing faster than everyone else's in

```
{
    "type" : "Topic",
    "start time" : "00:01:00"
    "granularity": "1",
    "topic": "earnings"
}
```

Figure 8:
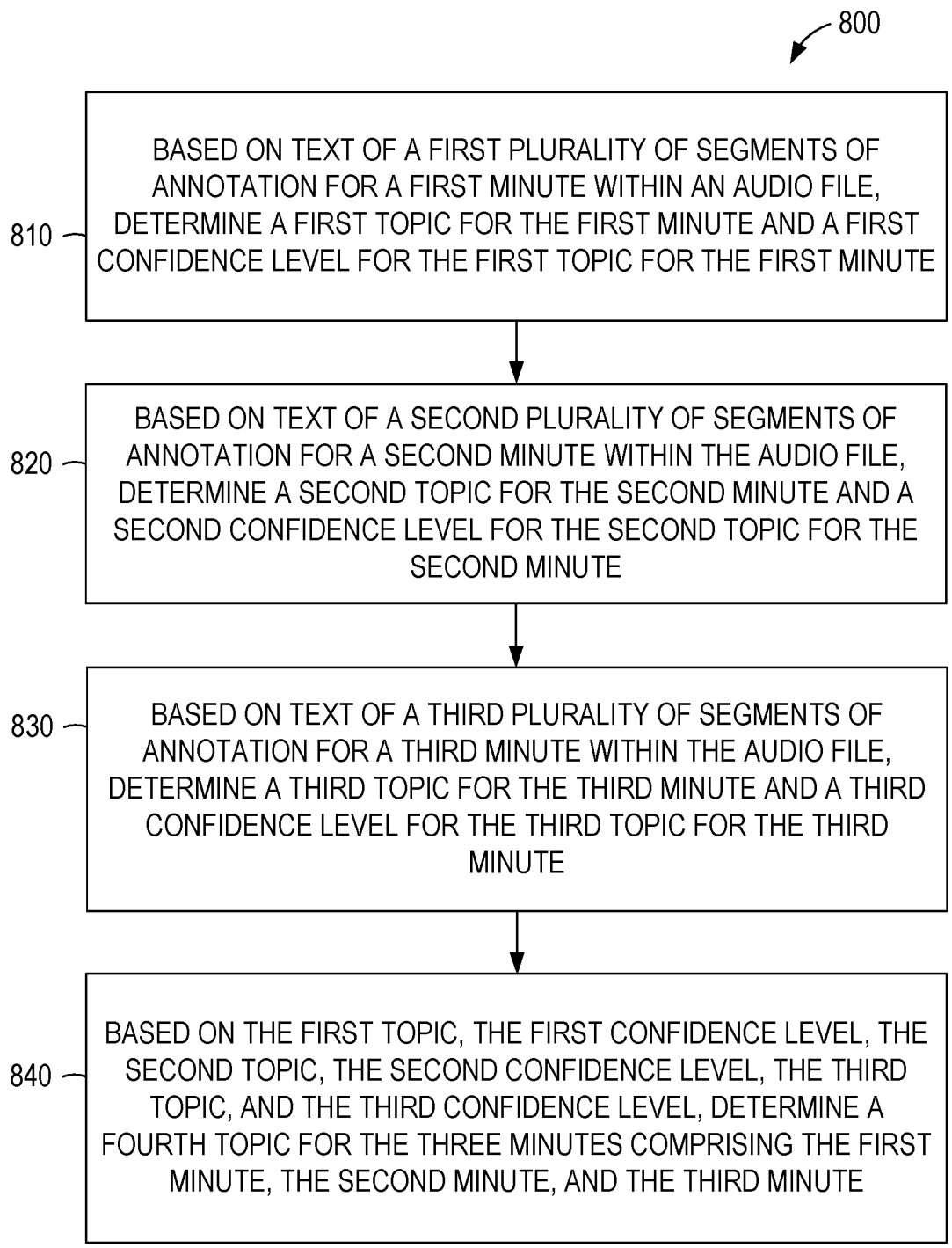
FIG. 8 is a flowchart illustrating operations of an example method suitable for annotating an audio file with topic information.

FIG. 8 is a flowchart illustrating operations of an example method 800 suitable for annotating an audio file with topic information. The method 800 includes operations 810, 820, 830, and 840. By way of example and not limitation, the method 800 may be performed by the topic detection server 150, using the modules, databases, and structures shown in FIGS. 2-4.

In operation 810, the topic detection server 150, based on text of a first plurality of segments of annotation for a first minute within an audio file, determines a first topic for the first minute and a first confidence level for the first topic for the first minute. As shown in the example annotation file used with reference to FIG. 7, text is stored in association with corresponding segments of an audio file. The text for the segments corresponding to a first minute of the audio file are used to determine a first topic and a first confidence level. For example, the words of the text corresponding to the first minute may be converted into a vector representation using the language embedder 410 of FIG. 4. An average of the vectors may be determined and provided as an input to one or more machine learning models, such as the neural network 320 of FIG. 3, to generate a topic and a probability that the generated topic is accurate (a type of confidence level).

Based on text of a second plurality of segments of annotation for a second minute within the audio file, the topic detection server 150 determines a second topic for the second minute and a second confidence level for the second topic for the second minute (operation 820). In operation 830, this step is repeated for text of a third plurality of segments of annotations for a third minute within the audio file, determining a third topic for the third minute and a third confidence level for the third topic for the third minute.

In operation 840, the topic detection server 150, based on the first topic, the second topic, the third topic, the first confidence level, the second confidence level, and the third confidence level, determines a fourth topic for the three minutes comprising the first minute, the second minute, and the third minute. For example, if all three topics are the same, the topic of the three minutes is the same as the topics of the three component minutes. As another example, if all three topics are different, the topic of the three minutes is the topic having the highest corresponding confidence level.

The method 800 may be repeated to generate one-minute and three-minute topics for each one-minute and three-minute segment of the audio file. The one-minute and three-minute topics may be embedded in an annotation file for the audio file. Example topic annotations are shown below, with the "granularity" field indicating whether each annotation is for a one-minute topic or a three-minute topic.

```
{
    "type" : "Topic",
    "start time" : "00:01:00",
    "granularity": "1",
    "topic": "earnings"
}
{
    "type" : "Topic",
    "start time" : "00:02:00",
    "granularity": "1",
    "topic": "savings"
}
{
    "type" : "Topic",
    "start time" : "00:03:00",
    "granularity": "1",
    "topic": "earnings"
}
{
    "type" : "Topic",
    "start time" : "00:01:00"
    "granularity": "3",
    "topic": "earnings"
}
```

By way of example and not limitation, the method 800 uses single minutes as the smaller unit of time and three minutes as the larger unit of time. Either or both of these time units may be changed. For example, seven minutes may be used as the larger unit of time. In this example, topics and confidence levels are determined for seven one-minute segments and a seven-minute topic is determined based on the seven topics and confidence levels of the component minutes. As another example, thirty seconds may be used as the smaller unit of time. In this example, topics and confidence levels are determined for six thirty-second segments and a three-minute topic is determined based on the six topics and confidence levels of the component thirty-second segments. An example of annotations storing one-minute, three-minute, and seven-minute topics is shown below.

```
{
    "type" : "Topic",
    "start time" : "00:01:00"
    "granularity": "1",
    "topic": "earnings"
}
{
    "type" : "Topic",
    "start time" : "00:02:00"
    "granularity": "1",
    "topic": "savings"
}
{
    "type" : "Topic",
    "start time" : "00:03:00",
    "granularity": "1",
    "topic": "earnings"
}
{
    "type" : "Topic",
    "start time" : "00:01:00",
    "granularity": "3",
    "topic": "earnings"
}
{
    "type" : "Topic",
    "start time" : "00:04:00",
    "granularity": "1",
    "topic": "games"
}
{
    "type" : "Topic",
    "start time" : "00:05:00",
    "granularity": "1",
    "topic": "games"
}
{
    "type" : "Topic",
    "start time" : "00:06:00",
    "granularity": "1",
    "topic": "movies"
}
```

```
        }
        {
            "type" : "Topic",
                "start time" : "00:04:00",
                "granularity": "3",
                "topic": "games"
        }
        {
            "type" : "Topic",
                "start time" : "00:07:00",
                "granularity": "1",
                "topic": "movies"
        }
        {
            "type" : "Topic",
                "start time" : "00:01:00",
                "granularity": "7",
                "topic": "movies"
        }
```

Figure 9:
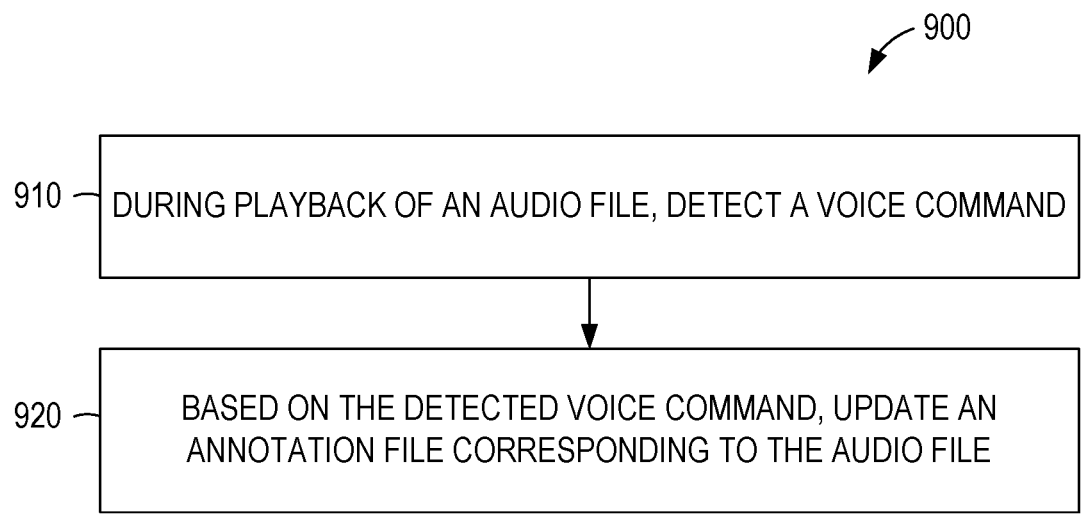
FIG. 9 is a flowchart illustrating operations of an example method suitable for annotating an audio file based on a voice command.

FIG. 9 is a flowchart illustrating operations of an example method 900 suitable for annotating an audio file based on a voice command. The method 900 includes operations 910 and 920. By way of example and not limitation, the method 900 may be performed by the voice command server 140 of FIG. 1, using the modules, databases, and user interfaces shown in FIGS. 2-6.

In operation 910, during playback of an audio file, the voice command server 140 detects a voice command. For example, a microphone of a client device 190 may receive audio input and provide it to the client device 190 for processing. The web browser or application providing the web interface 170 or the app interface 180 may transmit the audio input over the network 195 to the voice command server 140. The voice command server 140 determines that the audio input is a voice command. The audio input may be converted to text via speech-to-text conversion and the text used to determine that the audio input is a voice command (e.g., by comparing the text to a list of text for voice commands).

The voice command server 140, in operation 920, based on the detected voice command, updates an annotation file corresponding to the audio file. For example, with reference to FIG. 6, a voice command to add the comment, "Forward to Jerry" may be received. In response, an annotation such as that shown below may be added to the annotation file.

```
        {
            "type" : "Comment",
                "start time" : "00:07:55",
                "comment": "Forward to Jerry"
        }
```

As another example, the command may be to "highlight the last five seconds." In response, each text segment may be annotated to indicate that the corresponding portion of the audio file has been highlighted. The annotation may include a timestamp that indicates when the highlight was added. The example below is illustrative.

00:01:11.990→00:01:14.539
our earning release the company is at

```
        {
            "type": "Highlight",
                "timestamp": "1278999698"
        }
```

```
        00:01:14.539 --> 00:01:15.549
        maximum strength our revenues are
        {
            "type": "Highlight",
                "timestamp": "1278999698"
        }
        00:01:16.640 --> 00:01:17.650
        growing faster than everyone else's in
        {
            "type": "Highlight",
                "timestamp": "1278999698"
        }
```

In view of the above-described implementations of subject matter, this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: accessing, by one or more processors, an annotation file for an audio file, the annotation file comprising a plurality of segments, each segment of the plurality of segments comprising a timestamp and text corresponding to the timestamp; determining, by the one or more processors, based on the text of the plurality of segments, a plurality of topics; and modifying the annotation file to include the determined plurality of topics.

In Example 2, the subject matter of Example 1 includes, wherein the determining of the plurality of topics comprises determining, based on the text of the segments corresponding to each minute of the audio file, a topic for the minute of the audio file.

In Example 3, the subject matter of Example 2 includes, determining, based on the text of the segments corresponding to each minute of the audio file, a confidence of the determined topic for the minute of the audio file.

In Example 4, the subject matter of Example 3 includes, wherein the determining of the plurality of topics comprises determining, based on the topics and the confidences of the topics for the minutes of the audio file, a topic for multiple minutes of the audio file.

In Example 5, the subject matter of Examples 1-4 includes, based on a voice command, modifying the annotation file to indicate that a set of segments are highlighted.

In Example 6, the subject matter of Example 5 includes, wherein the voice command comprises an indication of a duration of the audio file to highlight.

In Example 7, the subject matter of Examples 5-6 includes, wherein the modifying of the annotation file includes storing a timestamp that indicates when the set of segments were highlighted.

In Example 8, the subject matter of Examples 1-7 includes, based on a voice command, modifying the annotation file to include a comment on a segment.

In Example 9, the subject matter of Examples 1-8 includes, identifying, based on the text of a segment, a named entity and a type of the named entity; and modifying the annotation file to include an indication that the segment includes the named entity, the indication comprising the type of the named entity.

In Example 10, the subject matter of Example 9 includes, based on search criteria and the indication, identifying the segment, the search criteria comprising a type of named entity and a period of time within the audio file.

In Example 11, the subject matter of Examples 1-10 includes, based on a voice command, copying the text of a set of segments to a clipboard.

In Example 12, the subject matter of Examples 1-11 includes, based on a voice command, modifying the annotation file to include at least a portion of text corresponding to the voice command.

Example 13 is a system comprising: a memory that stores instructions; and one or more processors configured by the instructions to perform operations comprising: accessing an annotation file for an audio file, the annotation file comprising a plurality of segments, each segment of the plurality of segments comprising a timestamp and text corresponding to the timestamp; determining based on the text of the plurality of segments, a plurality of topics; and modifying the annotation file to include the determined plurality of topics.

In Example 14, the subject matter of Example 13 includes, wherein the determining of the plurality of topics comprises determining, based on the text of the segments corresponding to each minute of the audio file, a topic for the minute of the audio file.

In Example 15, the subject matter of Example 14 includes, wherein the operations further comprise: determining, based on the text of the segments corresponding to each minute of the audio file, a confidence of the determined topic for the minute of the audio file.

In Example 16, the subject matter of Example 15 includes, wherein the determining of the plurality of topics comprises determining, based on the topics and the confidences of the topics for the minutes of the audio file, a topic for multiple minutes of the audio file.

In Example 17, the subject matter of Examples 13-16 includes, wherein the operations further comprise: based on a voice command, modifying the annotation file to include a comment on a segment.

Example 18 is a non-transitory computer-readable medium that stores instructions that, when executed by one or more processors, cause the one or more processors to perform operations comprising: accessing an annotation file for an audio file, the annotation file comprising a plurality of segments, each segment of the plurality of segments comprising a timestamp and text corresponding to the timestamp; determining, based on the text of the plurality of segments, a plurality of topics; and modifying the annotation file to include the determined plurality of topics.

In Example 19, the subject matter of Example 18 includes, wherein the operations further comprise: based on a voice command, modifying the annotation file to indicate that a set of segments are highlighted.

In Example 20, the subject matter of Example 19 includes, wherein the voice command comprises an indication of a duration of the audio file to highlight.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 10:
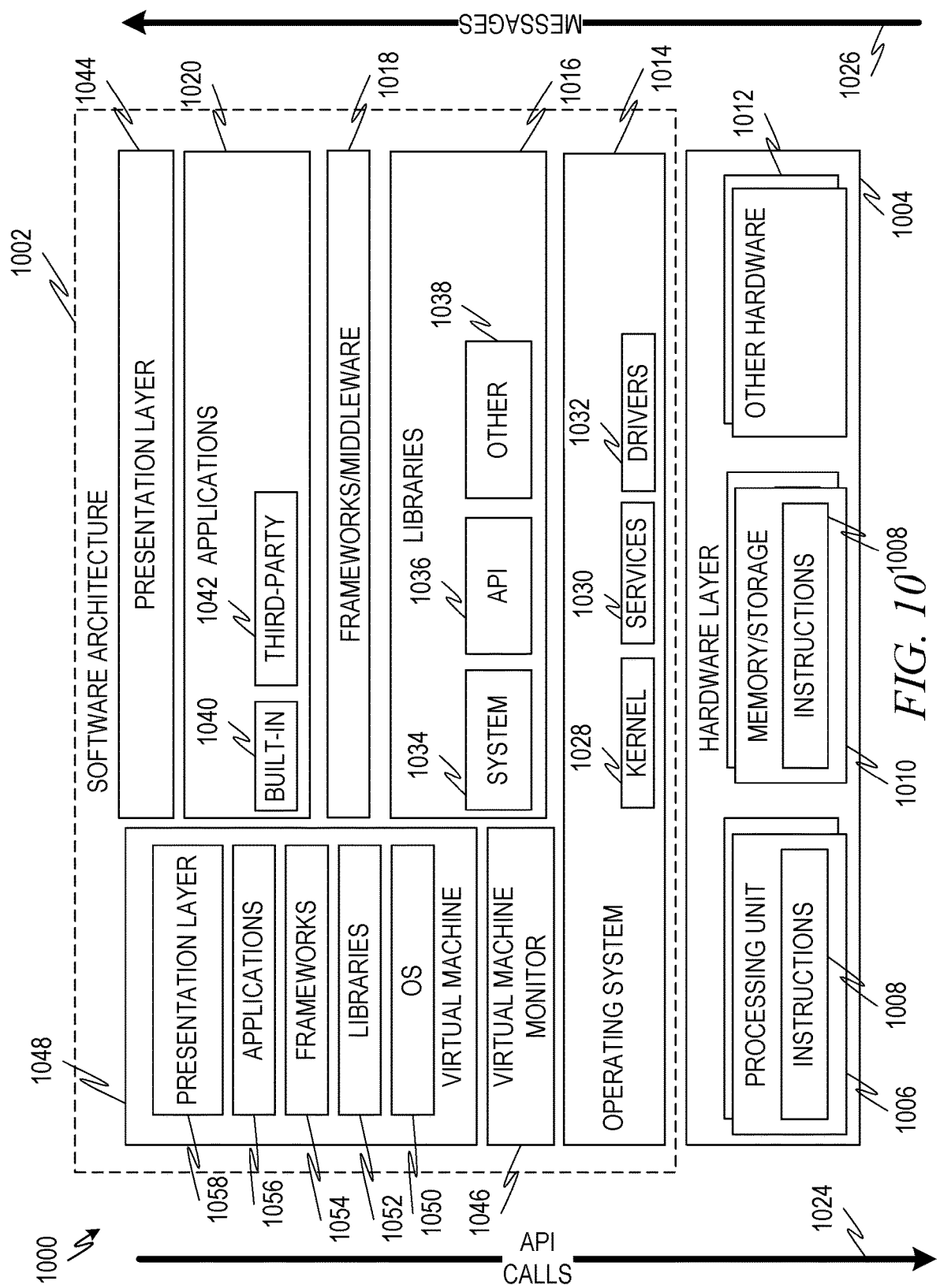
FIG. 10 is a block diagram showing one example of a software architecture for a computing device.

FIG. 10 is a block diagram 1000 showing one example of a software architecture 1002 for a computing device. The architecture 1002 may be used in conjunction with various hardware architectures, for example, as described herein. FIG. 10 is merely a non-limiting example of a software architecture and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system of FIG. 10.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012, which represents any other hardware of the hardware layer 1004, such as the other hardware illustrated as part of the software architecture 1002.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks/middleware 1018 may provide a higher-level common infrastructure that may be utilized by the applications 1020 and/or other software components/modules. For example, the frameworks/middleware 1018 may provide various graphical user interface (GUI) functions, high-level resource management, high-level location services, and so forth. The frameworks/middleware 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any of the built-in applications as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built in operating system functions (e.g., kernel 1028, services 1030 and/or drivers 1032), libraries (e.g., system libraries 1034, API libraries 1036, and other libraries 1038), frameworks/middleware 1018 to create user interfaces to interact with users of the system. Alternatively, or additionally, in some systems, interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine as well as the interface with the host operating system (i.e., operating system 1014). A software architecture executes within the virtual machine 1048 such as an operating system 1050, libraries 1052, frameworks/middleware 1054, applications 1056, and/or presentation layer 1058. These layers of software architecture executing within the virtual machine 1048 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and
Machine-Readable Medium

Figure 11:
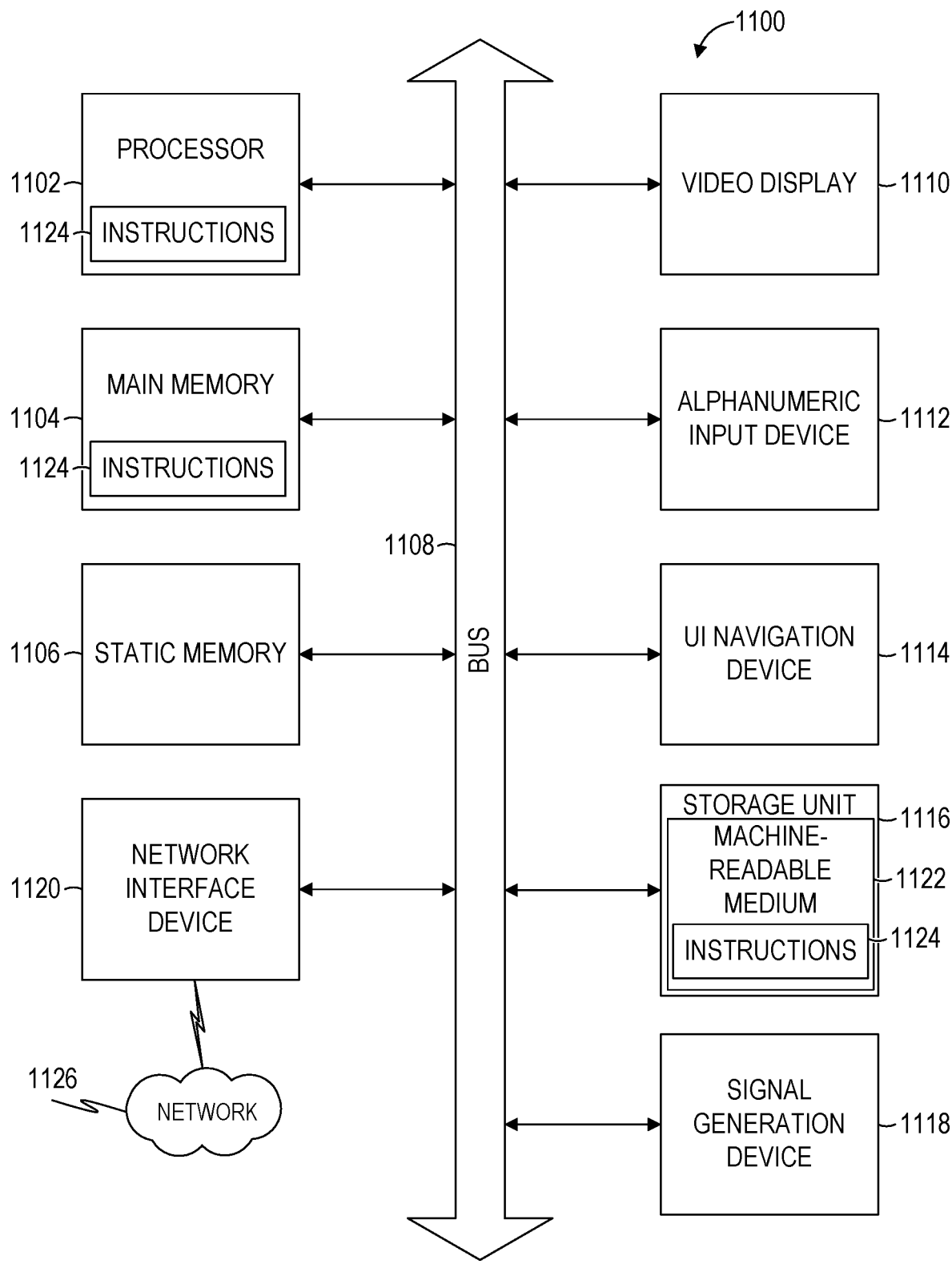
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a storage unit 1116, a signal generation device 1118 (e.g., a speaker), and a network interface device 1120.

Machine-Readable Medium

The storage unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in FIG. 11 to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1124 may further be transmitted or received over a communications network 1126 using a transmission medium. The instructions 1124 may be transmitted using the network interface device 1120 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
   accessing, by one or more processors, an annotation file for an audio file, the annotation file comprising a text transcription of the audio file;
   determining, by the one or more processors, based on the text transcription, a topic for each segment of a plurality of segments of a first predetermined length;
   determining, by the one or more processors, a confidence level of the topic for each segment of the plurality of segments;
   determining, by the one or more processors, a topic for each larger segment of a plurality of larger segments, each larger segment comprising a predetermined number of consecutive component segments of the plurality of segments, the determining of the topic for a larger segment based on the topics of the component segments and the confidence levels of the topics of the component segments; and
   modifying the annotation file to include the determined topics for the plurality of larger segments.

2. The method of claim 1, wherein the first predetermined length is one minute.

3. The method of claim 1, further comprising:
   based on a voice command, modifying the annotation file to indicate that a portion of the text transcription is highlighted.

4. The method of claim 3, wherein the voice command comprises an indication of a duration of the audio file to highlight.

5. The method of claim 3, wherein the modifying of the annotation file includes storing a timestamp that indicates when the portion of the text transcription was highlighted.

6. The method of claim 1, further comprising:
   based on a voice command, modifying the annotation file to include a comment.

7. The method of claim 1, further comprising:
   identifying, based on a segment, a named entity and a type of the named entity; and
   modifying the annotation file to include an indication that the segment includes the named entity, the indication comprising the type of the named entity.

8. The method of claim 7, further comprising:
based on search criteria and the indication, identifying the segment, the search criteria comprising a type of named entity and a period of time within the audio file.

9. The method of claim 1, further comprising:
based on a voice command, copying a portion of the text transcription to a clipboard.

10. The method of claim 1, further comprising:
based on a voice command, modifying the annotation file to include at least a portion of text corresponding to the voice command.

11. The method of claim 1, wherein the determining of the topic for each larger segment of the plurality of larger segments comprises selecting from among the topics of the component segments based on the confidence levels of the topics of the component segments.

12. The method of claim 1, wherein the multiple is three.

13. The method of claim 1, wherein the multiple is seven.

14. A system comprising:
a memory that stores instructions; and
one or more processors configured by the instructions to perform operations comprising:
accessing an annotation file for an audio file, the annotation file comprising a text transcription of the audio file;
determining based on the text transcription, a topic for each segment of a plurality of segments of a first predetermined length;
determining a confidence level of the topic for each segment of the plurality of segments;
determining a topic for each larger segment of a plurality of larger segments of a second predetermined length, each larger segment comprising a predetermined number of consecutive component segments of the plurality of segments, the determining of the topic for a larger segment based on the topics of the component segments and the confidence levels of the topics of the component segments; and
modifying the annotation file to include the determined topics for the plurality of larger segments.

15. The system of claim 14, wherein the first predetermined length is one minute.

16. The system of claim 14, wherein the operations further comprise:
based on a voice command, modifying the annotation file to include a comment.

17. The system of claim 14, wherein the operations further comprise:
identifying, based on a segment, a named entity and a type of the named entity; and
modifying the annotation file to include an indication that the segment includes the named entity, the indication comprising the type of the named entity.

18. A non-transitory computer-readable medium that stores instructions that, when executed by one or more processors, cause the one or more processors to perform operations comprising:
accessing an annotation file for an audio file, the annotation file comprising a text transcription of the audio file;
determining based on the text transcription, a topic for each segment of a plurality of segments of a first predetermined length;
determining a confidence level of the topic for each segment of the plurality of segments;
determining a topic for each larger segment of a plurality of larger segments of a second predetermined length, each larger segment comprising a predetermined number of consecutive component segments of the plurality of segments, the determining of the topic for a larger segment based on the topics of the component segments and the confidence levels of the topics of the component segments; and
modifying the annotation file to include the determined topics for the plurality of larger segments.

19. The non-transitory computer-readable medium of claim 18, wherein the operations further comprise:
based on a voice command, modifying the annotation file to indicate that a portion of the text transcription is highlighted.

20. The non-transitory computer-readable medium of claim 19, wherein the voice command comprises an indication of a duration of the audio file to highlight.

* * * * *